United States Patent
Lee et al.

(10) Patent No.: US 8,213,896 B2
(45) Date of Patent: *Jul. 3, 2012

(54) METHOD OF RECEIVING A DISASTER WARNING MESSAGE USING SCHEDULING INFORMATION INCLUDED IN SYSTEM INFORMATION WITHIN MOBILE COMMUNICATION SYSTEM

(75) Inventors: Young-Dae Lee, Gyeonggi-Do (KR); Sung-Jun Park, Gyeonggi-Do (KR); Seung-June Yi, Gyeonggi-Do (KR); Sung-Duck Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 333 days.

This patent is subject to a terminal disclaimer.

(21) Appl. No.: 12/406,569

(22) Filed: Mar. 18, 2009

(65) Prior Publication Data

US 2009/0239498 A1   Sep. 24, 2009

Related U.S. Application Data

(60) Provisional application No. 61/038,035, filed on Mar. 19, 2008, provisional application No. 61/037,681, filed on Mar. 18, 2008.

(30) Foreign Application Priority Data

Mar. 17, 2009   (KR) .................. 10-2009-0022689

(51) Int. Cl.
*H04M 11/04* (2006.01)
*H04B 1/38* (2006.01)

(52) U.S. Cl. .................. 455/404.1; 455/90.1

(58) Field of Classification Search ............ 455/404.1, 455/404.2, 90.1
See application file for complete search history.

(56) References Cited

U.S. PATENT DOCUMENTS

| | | | |
|---|---|---|---|
| 7,519,352 B2 * | 4/2009 | Aoyama | 455/404.1 |
| 2003/0194992 A1 * | 10/2003 | Kim et al. | 455/414.1 |
| 2004/0259568 A1 | 12/2004 | Patel | |
| 2005/0037728 A1 | 2/2005 | Binzel et al. | |
| 2006/0135091 A1 * | 6/2006 | Ntsonde et al. | 455/95 |
| 2006/0166693 A1 * | 7/2006 | Jeong et al. | 455/525 |
| 2007/0173224 A1 * | 7/2007 | Buckley et al. | 455/404.1 |
| 2008/0108331 A1 * | 5/2008 | Jin et al. | 455/414.1 |
| 2008/0170526 A1 * | 7/2008 | Narang et al. | 370/311 |
| 2008/0227428 A1 * | 9/2008 | Rezaiifar et al. | 455/404.1 |
| 2008/0273610 A1 * | 11/2008 | Malladi et al. | 375/260 |
| 2009/0239554 A1 * | 9/2009 | Sammour et al. | 455/458 |

(Continued)

FOREIGN PATENT DOCUMENTS

EP   1 739 868 A1   1/2007

(Continued)

OTHER PUBLICATIONS

3GPP, "3rd Generation Partnership Project; Techinal Specification Group Services and System Aspects; Earthquake and Tsunami Warning System (ETWS) Requirements; Stage 1 (Release 8)," TS 22.168 V1.2.1, XP050280536, pp. 1-12, Jan. 2008.

*Primary Examiner* — Christopher M Brandt
(74) *Attorney, Agent, or Firm* — Birch, Stewart, Kolasch & Birch, LLP

(57) ABSTRACT

Disclosed is a method of receiving a warning message in wireless communication system. A terminal (UE) receives system information through a control channel such as a Broadcast Control Channel (BCCH), and receives a warning message through a downlink channel according to scheduling information related to the warning message included in the system information.

9 Claims, 6 Drawing Sheets

U.S. PATENT DOCUMENTS

2010/0120395 A1* 5/2010 Chiba et al. ................. 455/404.2
2010/0183031 A1* 7/2010 Dalsgaard et al. ............ 370/474

FOREIGN PATENT DOCUMENTS

| KR | 10-2002-0039121 A | 5/2002 |
| KR | 10-2003-0084859 A | 11/2003 |
| KR | 10-2004-0024327 A | 3/2004 |
| KR | 10-2007-0079453 A | 8/2007 |
| WO | WO 03/010900 A1 | 2/2003 |
| WO | WO-2007/004769 A1 | 1/2007 |
| WO | WO 2007/045564 A1 | 4/2007 |
| WO | WO 2007/148703 A1 | 12/2007 |

* cited by examiner

METHOD OF RECEIVING A DISASTER WARNING MESSAGE USING SCHEDULING INFORMATION INCLUDED IN SYSTEM INFORMATION WITHIN MOBILE COMMUNICATION SYSTEM

The Nonprovisional application claims priority under 35 U.S.C. 119(e) to U.S. Provisional Application Nos. 61/037,681 filed on Mar. 18, 2008, and 61/038,035 filed on Mar. 19, 2008. This application also claims priority under 35 U.S.C. §119(a) on Patent Application No. 10-2009-0022689 filed in the Republic of Korea on Mar. 17, 2009, the entire contents of all are hereby incorporated by reference into the present application.

BACKGROUND OF THE INVENTION

1. Field of the Invention

The present invention relates to a method of receiving a disaster warning message (or any warning message) in wireless communication system. More particularly, a terminal (UE), which attempts to receive the warning message, receives a Broadcast Control Channel (BCCH) within a corresponding cell, obtains system information through the BCCH, and receives a warning message through a downlink channel according to scheduling information about the warning message included in the system information.

2. Description of the Related Art

FIG. 1 shows an exemplary network structure of an Evolved Universal Mobile Telecommunications System (E-UMTS) as a mobile communication system to which a related art and the present invention are applied. The E-UMTS system is a system that has evolved from the UMTS system, and its standardization work is currently being performed by the 3GPP standards organization. The E-UMTS system can also be referred to as a Long-Term Evolution (LTE) system.

The E-UMTS network can roughly be divided into an Evolved Universal Terrestrial Radio Access Network (E-UTRAN) and a Core Network (CN). The E-UTRAN generally comprises a terminal (i.e., User Equipment (UE)), a base station (i.e., eNode B), and an Access Gateway (AG) that is located at an end of the E-UMTS network and connects with one or more external networks. The AG may be divided into a part for processing user traffic and a part for handling control traffic. Here, an AG for processing new user traffic and an AG for processing control traffic can be communicated with each other by using a new interface. One eNode B may have one or more cells. An interface for transmitting the user traffic or the control traffic may be used among the eNode Bs. The CN may comprise an AG, nodes for user registration of other UEs, and the like. An interface may be used to distinguish the E-UTRAN and the CN from each other.

Radio interface protocol layers between the terminal and the network can be divided into a first layer (L1), a second layer (L2) and a third layer (L3) based on three lower layers of an Open System Interconnection (OSI) standard model widely known in communications systems. A physical layer belonging to the first layer provides an information transfer service using a physical channel. A Radio Resource Control (RRC) layer located at the lowest portion of the third layer controls radio resources between the terminal and the network. For this purpose, the RRC layer allows RRC messages to be exchanged between the terminal and the network.

FIG. 2 shows radio interface protocol architecture between a terminal and E-UTRAN based on 3GPP radio access network standards. The radio interface protocol in FIG. 2 have horizontal layers comprising a physical layer, a data link layer and a network layer, and has vertical planes comprising a user plane for transmitting user traffic and a control plane for transmitting control signals. The protocol layers in FIG. 2 can be divided into a first layer (L1), a second layer (L2) and a third layer (L3) based on three lower layers of an Open System Interconnection (OSI) standard model widely known in communications systems. Hereinafter, each layer in the radio protocol architecture in FIG. 2 will be described.

A first layer, as a physical layer, provides an information transfer service to an upper layer using a physical channel. The physical layer is connected to its upper layer, called a Medium Access Control (MAC) layer, via a transport channel. The MAC layer and the physical layer exchange data via the transport channel. Data is transferred via a physical channel between different physical layers, namely, between the physical layer of a transmitting side and the physical layer of a receiving side. The physical channel is modulated based on an Orthogonal Frequency Division Multiplexing (OFDM) technique, and utilizes time and frequency as radio resources.

The MAC layer located at the second layer provides a service to an upper layer, called a Radio Link Control (RLC) layer, via a logical channel. The RLC layer of the second layer supports reliable data transmissions. The function of the RLC layer may be implemented as a functional block in the MAC layer. In this case, the RLC layer may not exist. A Packet Data Convergence Protocol (PDCP) layer of the second layer, in the radio protocol user plane, is used to efficiently transmit IP packets, such as IPv4 or IPv6, on a radio interface with a relatively narrow bandwidth. For this purpose, the PDCP layer reduces the size of an IP packet header which is relatively great in size and includes unnecessary control information, namely, a function called header compression is performed.

A Radio Resource Control (RRC) layer located at the lowest portion of the third layer is only defined in the control plane. The RRC layer controls logical channels, transport channels and physical channels in relation to establishment, re-configuration and release of Radio Bearers (RBs). Here, the RB signifies a service provided by the second layer for data transmissions between the terminal and the E-UTRAN. If an RRC connection is established between the RRC layer of the terminal and the RRC layer of the radio network, the terminal is in the RRC connected mode. Otherwise, the terminal is in an RRC idle mode.

A Non-Access Stratum (NAS) layer located at an upper portion of the RRC layer performs functions, such as session management, mobility management and the like.

One cell constructing an eNB is set to one of bandwidths of 1.25 MHz, 2.5 MHz, 5 MHz, 10 MHz, 20 MHz and the like, so as to provide downlink or uplink transmission services to multiple terminals. Here, different cells may be set to provide different bandwidths.

Downlink transport channels for transmitting data from a network to a terminal may comprise a Broadcast Channel (BCH) for transmitting system information, a Paging Channel (PCH) for transmitting paging messages and a downlink Shared Channel (SCH) for transmitting other user traffic or control messages. Traffic or control messages of a downlink point-to-multipoint service (multicast or broadcast service) may be transmitted either via a downlink SCH, or via a separate downlink Multicast Channel (MCH). In addition, uplink transport channels for transmitting data from a terminal to a network may comprise a Random Access Channel (RACH) for transmitting an initial control message and an uplink Shared Channel (SCH) for transmitting user traffic or control messages.

Logical channels which are located at an upper portion of transport channels and mapped to the transport channels include a Broadcast Control Channel (BCCH), a Paging Control Channel (PCCH), a Common Control Channel (CCCH), a MBMS point-to-multipoint Control Channel/Multicast Control Channel (MCCH), a MBMS point-to-multipoint Traffic Channel/Multicast Traffic Channel (MTCH), and the like.

FIG. 3 shows a transmission on a control channel according to the related art.

A physical channel is composed of multiple sub-frames arranged on a time axis and multiple sub-carriers arranged on a frequency axis. Here, a single sub-frame includes a plurality of symbols on the time axis. One sub-frame is composed of a plurality of resource blocks, each of which includes a plurality of symbols and a plurality of sub-carriers. Also, each sub-frame can use particular sub-carriers of particular symbols (e.g., a first symbol) at the corresponding sub-frame for a Physical Downlink Control Channel (PDCCH), namely, a L1/L2 control channel. One sub-frame is time duration of 0.5 ms. A Transmission Time Interval (TTI) as a unit time for which data is transmitted is 1 ms corresponding to two sub-frames.

FIG. 4 is a block diagram of a network structure for a cell broadcast service. As illustrated in FIG. 4, CBS messages originate in a plurality of cell broadcast entities (hereinafter abbreviated CBEs) connected to a cell broadcast center (hereinafter abbreviated CBC). The CBE separates the CBS message into a plurality of pages. The CBC is one node of a core network that performs a scheduling function by managing the CBS message. Iu-BC is an interface defined between the CBC and the RNC using a service area broadcast protocol (hereinafter abbreviated SABP). The CBC can give the RNC a broadcast order for a new message or enable a previous broadcast message to be modified or terminated using the SABP. The RNC performs a scheduling function for a CBS message delivered by the CBC and a broadcasting function to transmit the message to a specific cell using a BMC protocol. The RNC has a broadcast/multicast inter-working function (hereinafter abbreviated BMC-IWF) above a BMC layer to perform an interpreting function for a message and information delivered from the CBC. The UE receives a CBS message broadcast by the UTRAN. Examples of BMC messages used in the BMC protocol are a CBS message delivering user information, a schedule message facilitating reception of a CBS message by a UE and a CBS41 message delivering a short message delivered from an ANSI41 network. All the messages are transmitted from the UTRAN to the UE in uni-direction through a logical channel such as CTCH (Common Traffic Channel). The UE can reduce its battery consumption by performing a discontinuous reception (hereinafter abbreviated DRX) using information in the schedule message transmitted by the UTRAN through CTCH (Common Traffic Channel).

In a conventional Cell Broadcast Service (CBS) scheme, scheduling information related to a warning message is transmitted through a Common Traffic Channel (CTCH). Therefore, in a related art, this cause a great drawback that a terminal can not promptly or quickly receive scheduling information of the warning message since the terminal usually receives a traffic channel after receiving of the control channel first.

SUMMARY OF THE INVENTION

The present invention is to provide a method for efficiently receiving a warning message, by a terminal, with a minimum delay while efficient usage of radio resource(s) is achieved.

To implement at least the above feature in whole or in parts the present invention may provide a method of receiving a warning message in mobile communication system, the method comprising: receiving control information related to the warning message through a control channel; and receiving the warning message based on the received control information through a downlink channel.

Additional features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

DETAILED DESCRIPTION OF THE INVENTION

One aspect of the present invention is the recognition by the present inventors regarding the problems and drawbacks of the related art described above and explained in more detail hereafter. Based upon such recognition, the features of the present invention have been developed.

The present invention may be embodied in a 3GPP communication technology, in particular, in the Universal Mobile Telecommunications System (UMTS) system, a communication apparatus and method thereof. However, the present invention may also be applied to all wired/wireless communications to which the technical scope of the present invention can be applied.

Hereinafter, description of structures and operations of the preferred embodiments according to the present invention will be given with reference to the accompanying drawings.

Figure 1:
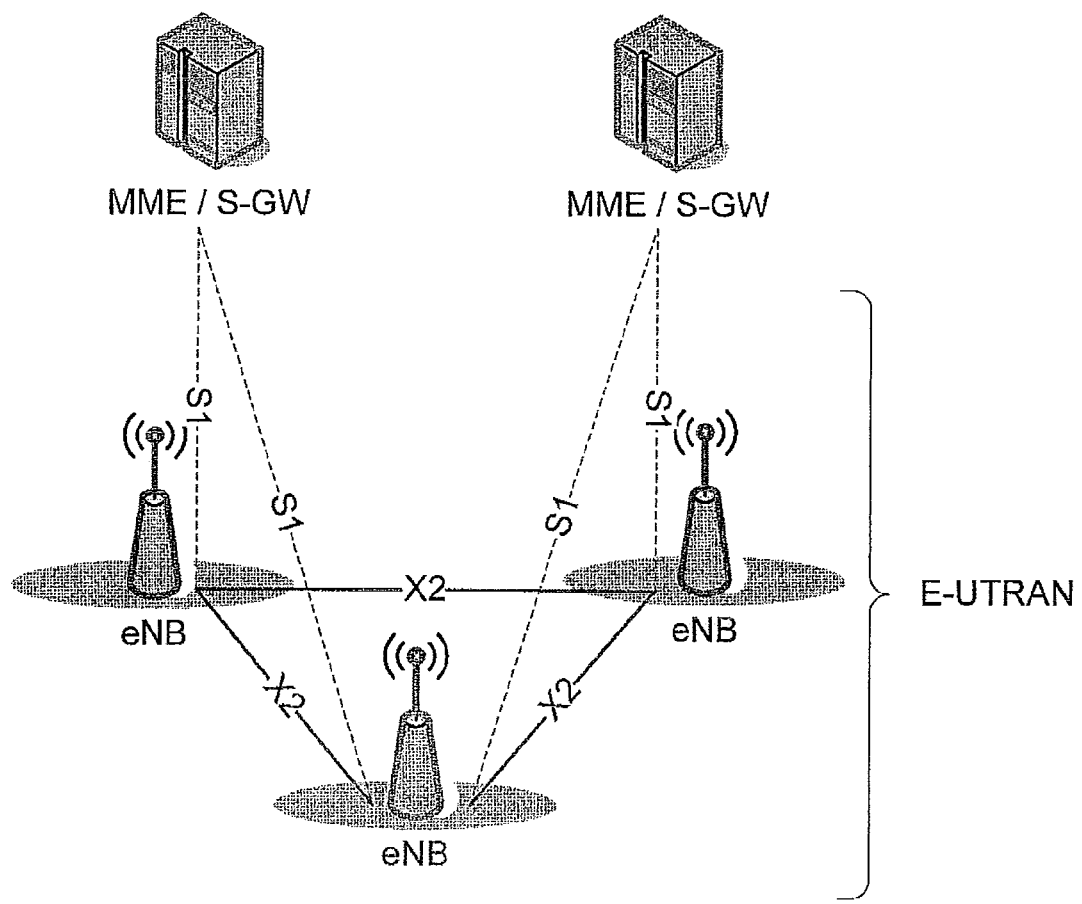
FIG. 1 shows an exemplary network structure of an Evolved Universal Terrestrial Radio Access Network (E-UTRAN) as a mobile communication system to which a related art and the present invention are applied.
Figure 2:
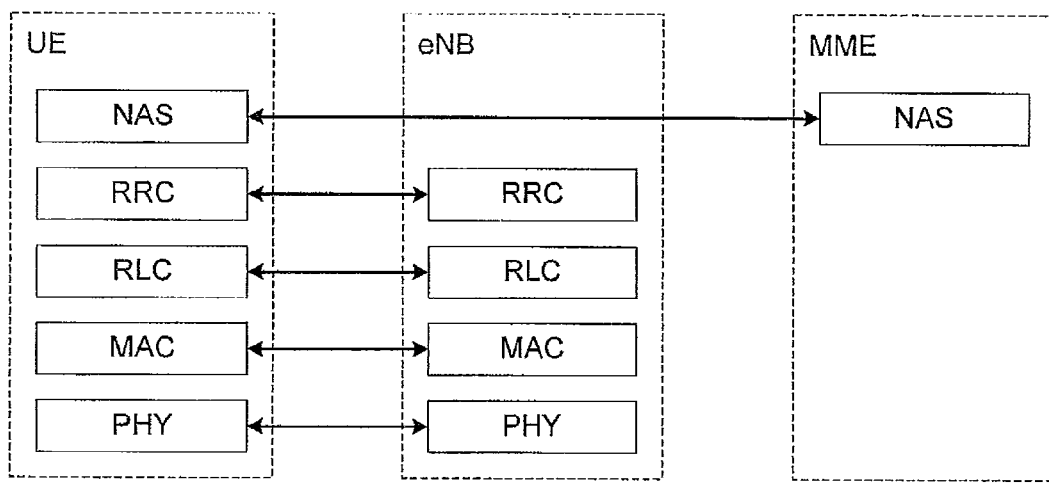
FIG. 2 shows a radio interface protocol architecture between a terminal and a Evolved UMTS Terrestrial Radio Access Network (E-UTRAN) based on 3GPP radio access network standards.
Figure 3:
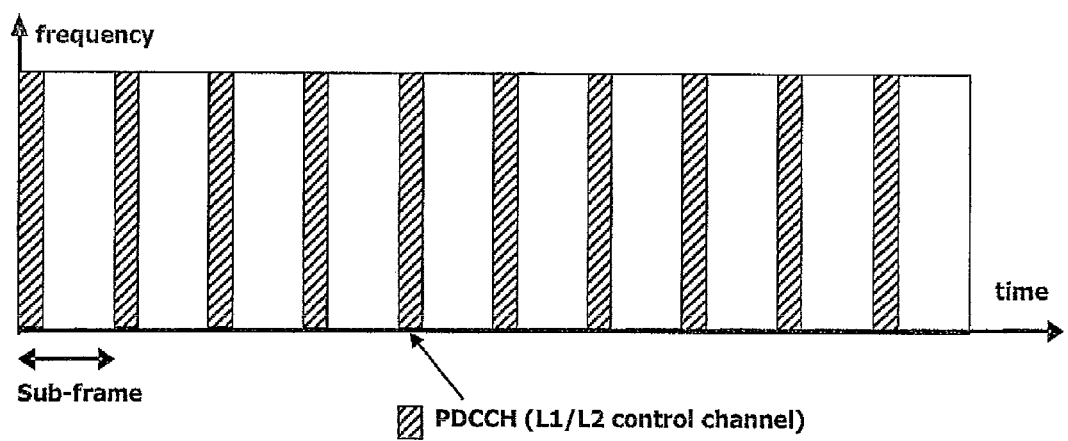
FIG. 3 shows an exemplary view of a related art physical channel structure for control channel transmission.
Figure 4:
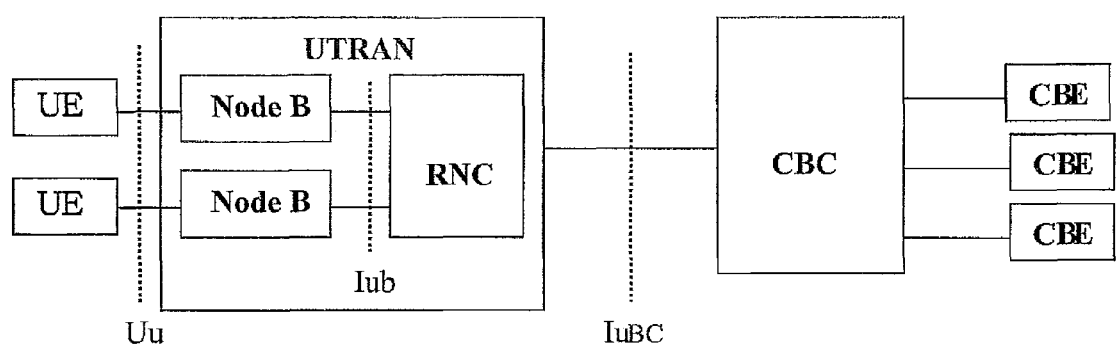
FIG. 4 shows an exemplary block diagram of a network structure for a cell broadcast service.
Figure 5:
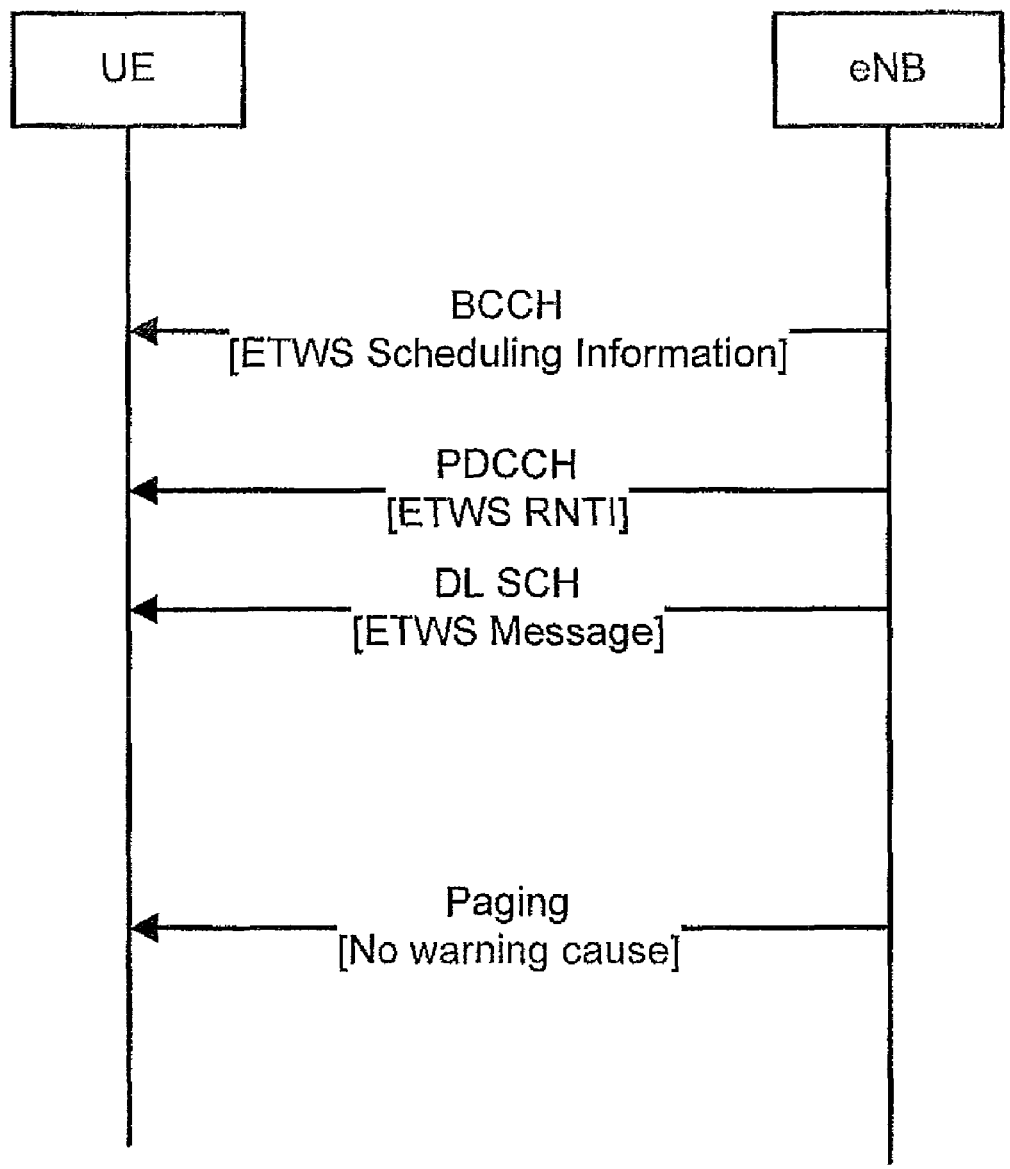
FIG. 5 shows a warning message transmission process according to a first embodiment of the present invention.

FIG. 5 shows a warning message transmission process according to a first embodiment of the present invention. In the present invention, a warning message (which will be referred as ETWS (Earthquake and Tsunami Warning System) message hereafter) may be transmitted through a logical channel broadcasting a control message to a plurality of terminals and a transport channel (i.e., Downlink Shared Channel; DL-SCH) mapping with the logical channel.

As illustrated in FIG. 5, in a first step, a terminal (UE) may receive system information through a logical channel such as a Broadcast Control Channel (BCCH). If the received system information contains scheduling information (or setup information or any other information related to the warning (ETWS) message) of the warning (ETWS) message, the terminal may further process a next step to receive the warning (ETWS) message. However, if the received system information does not contain the scheduling information of the warning (ETWS) message, the terminal may not further process a next step. Here, the scheduling information may include a certain time period that the warning (ETWS) message is transmitted. Namely, the scheduling information may include specific time information about when the warning (ETWS) message is transmitted.

In a second step, the terminal may receive or monitor a physical downlink control channel (PDCCH) for a certain time window/time period allocated for a transmission of the warning (ETWS) message according to the received scheduling information. Here, the terminal may receive a particular radio network temporary identifier (RNTI) through the physical downlink control channel (PDCCH).

In a third step, the terminal may receive the warning (ETWS) message through a downlink shared channel (DL-SCH), which corresponds to the physical downlink control channel (PDCCH), if the particular radio network temporary identifier (i.e., ETWS RNTI) is indicated in the physical downlink control channel during the second step. However, if the particular radio network temporary identifier is not indicated in the physical downlink control channel during the second step, the terminal may not receive the warning (ETWS) message through the downlink shared channel.

Here, a warning (ETWS) message is transmitted or received through a transport channel such as a downlink shared channel (DL-SCH), which is mapped with a logical control channel (i.e., shared logical channel) that is used for a plurality of terminals to receives control information commonly. Accordingly, the warning (ETWS) message may be transmitted through the logical control channel and the downlink shared channel by a base station. Also, the terminal may receive the warning (ETWS) message the logical control channel and the downlink shared channel.

Here, a base station (eNB) may retransmit the warning (ETWS) message using a HARQ (Hybrid Automatic Repeat reQuest) operation of the downlink shared channel. Therefore, if the terminal does not completely receive the warning (ETWS) message, the terminal may retry to receive the warning (ETWS) message using the HARQ operation. The system information and/or the warning (ETWS) message may be divided into a primary ETWS notification and a secondary ETWS notification. Namely, the primary ETWS notification and the secondary ETWS notification can be transmitted to the terminal at same time. Or, under a certain circumstance, the terminal may receive the secondary ETWS notification after receiving of the primary ETWS notification.

Figure 6:
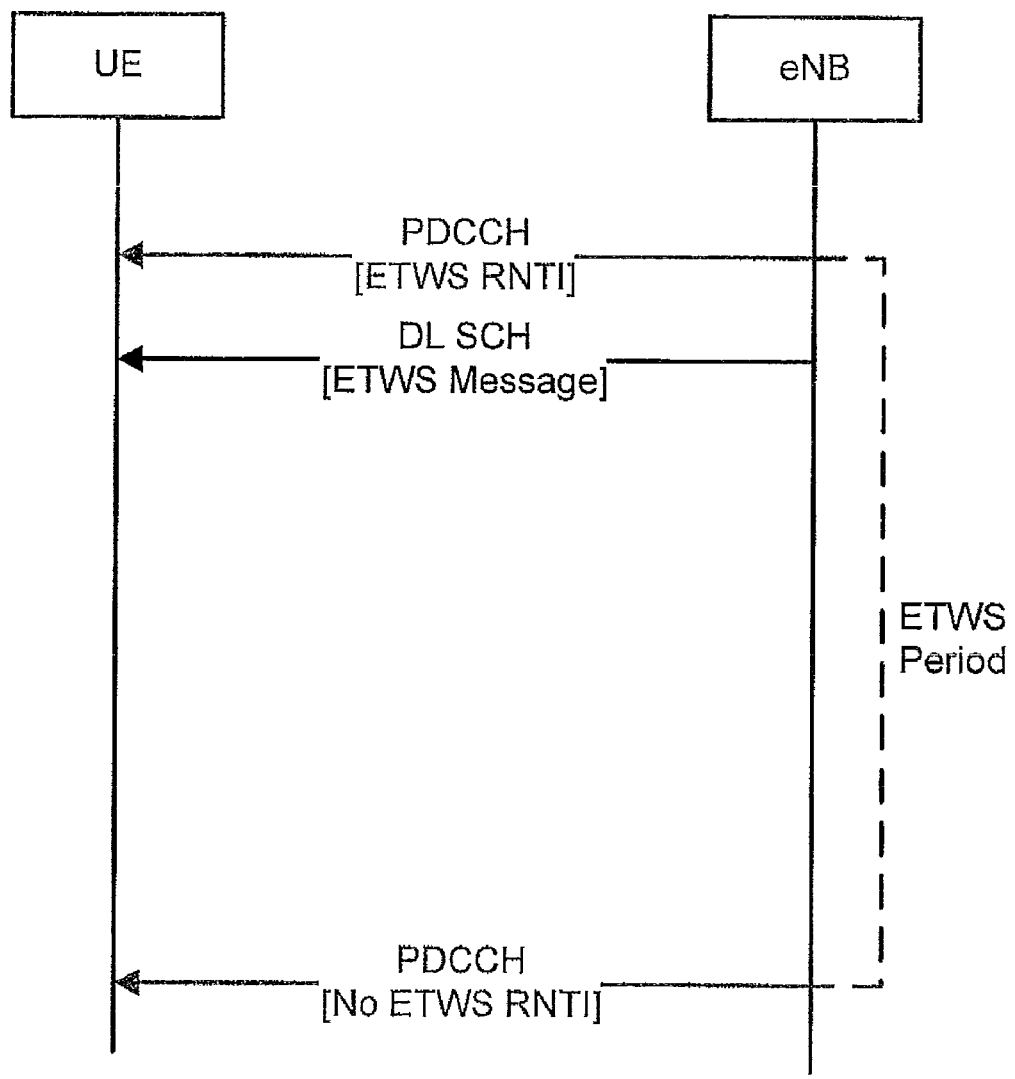
FIG. 6 shows a warning message transmission process according to a second embodiment of the present invention.

FIG. 6 shows a warning message transmission process according to a second embodiment of the present invention.

As illustrated in FIG. 6, in a first step, a terminal may receive or monitor a physical downlink control channel (PDCCH) for a certain time window/time period allocated for a transmission of the warning (ETWS) message according to the received scheduling information. Here, the terminal may receive a particular radio network temporary identifier (RNTI) through the physical downlink control channel (PDCCH). More specifically, the terminal may periodically monitor the certain time window according to an ETWS period for a receiving of the warning (ETWS) message. The ETWS period may be a paging DRX (Discontinuous Reception) period, which set for the terminal to periodically receive a paging from a base station, or a multiple of the paging DRX period. Accordingly, if the ETWS period is same as the paging DRX period, the terminal may monitor the warning (ETWS) message based on the paging DRX period.

In a second step, the terminal may receive the warning (ETWS) message through a downlink shared channel (DL-SCH), which corresponds to the physical downlink control channel (PDCCH), if the particular radio network temporary identifier is indicated in the physical downlink control channel during the first step. However, if the particular radio network temporary identifier is not indicated in the physical downlink control channel during the first step, the terminal may not receive the warning (ETWS) message through the downlink shared channel.

Here, a base station (eNB) may retransmit the warning (ETWS) message using a HARQ (Hybrid Automatic Repeat reQuest) operation of the downlink shared channel. Therefore, if the terminal does not completely receive the warning (ETWS) message, the terminal may retry to receive the warning (ETWS) message using the HARQ operation. The system information and/or the warning (ETWS) message may be divided into a primary ETWS notification and a secondary ETWS notification. Namely, the primary ETWS notification and the secondary ETWS notification can be transmitted to the terminal at same time. Or, under a certain circumstance, the terminal may receive the secondary ETWS notification after receiving of the primary ETWS notification.

The present invention may provide a method of receiving a warning message in mobile communication system, the method comprising: receiving control information related to the warning message through a control channel; and receiving the warning message based on the received control information through a downlink channel, wherein the warning message is an Earthquake and Tsunami Warning System (ETWS) message, the control information is system information (SI), the control channel is a Broadcast Control Channel (BCCH), the control information includes scheduling information of the warning message, the scheduling information includes time period information for the warning message, the downlink channel is a downlink shared channel (DL-SCH), the control information includes a primary ETWS notification and a secondary ETWS notification, and the primary ETWS notification is firstly received before the reception of the secondary ETWS notification, and the warning message is received through the DL-SCH based on information indicated on a Physical Downlink Control Channel.

Namely, the present invention has an effect of efficiently receiving a warning message with a minimum delay while efficient usage of radio resource(s) is achieved.

The present disclosure may provide potential solutions for ETWS (Earthquake and Tsunami Warning System) in E-UTRAN. Usually, usages of ETWS messages are very rare. Thus, UE may not need to monitor ETWS message every time for battery saving. However, once they take place, it will be beneficial to help users receive frequent update of Earthquake and Tsunami. For this reason above, the present disclosure may provide to have two steps to minimize UE battery power consumption. As for the first step, the eNB may transmit a primary indication of Earthquake and Tsunami Warning to the UE. Then, for the second step, the eNB may transmit a transfer/update of Earthquake and Tsunami Warning to the UE. Specifically, the eNB may provide the primary indication when the first warning is received. Afterwards, the eNB may prepare the second step to transmit updates of the warning. The UEs may periodically check if there is primary indication of the warning or not while performing a normal operation. If there is primary indication of the warning, the UEs move onto the second step and so receive next updates. Here, during the first step, the present disclosure proposes that the UE should check the warning only with minimal effort while performing a normal operation. On the other hand, during the second step, the UE must receive incoming warning messages with more effort.

More detailed description of the first step will be given as following. Start of the warning should be notified as quickly as possible. When UE is idle, paging message with a warning cause could be one of solutions. However, in most of cases, the paging message cannot reach to the UEs in connected mode because the UEs in connected mode do not monitor the paging message. Thus, following solutions can be used for connected UEs.

A first option is that indicating the start of the warning by changing of system information. The update of the warning is transmitted on a common logical channel dedicated to broadcast of the warning. If the warning begins, the system information carrying ETWS specific common channel configuration will be included in system information block (SIB). As a result, the UEs will receive change of system information for it. In this scheme, if the UEs find out that system information carrying ETWS specific common channel configuration is included in the SIB, the UEs may be notified the start of the warning. Then, the UEs may move onto the second step.

A second option is that indicating the start of the warning by using an ETWS specific RNTI on PDCCH. In most case, the connected UEs would frequently monitor the PDCCH with some RNTIs. Thus, the present disclosure may propose to use the ETWS specific RNTI. Therefore, if UEs finds the ETWS specific RNTI on the PDCCH, the UEs may be notified the start of the warning. Then, the UEs may move onto the second step. Here, when the warning starts, the eNB may repeat the ETWS specific RNTI on available PDCCH channels for certain duration in order to make sure that all UEs receive the ETWS specific RNTI. On the other hand, whenever the UE reads the PDCCH, the UE may need to check indication of the ETWS specific RNTI on the PDCCH in addition to other RNTI. In this option, the UEs should check additional RNTI. To alleviate it, the eNB may provide some periodic opportunities in which ETWS specific RNTI is allowed to be transmitted.

More detailed description of the second step will be given as following. Once the warning is notified to the UE, frequent update of Earthquake and Tsunami will be helpful for every user. In case that paging message is used for the first step, after the warning begins, several paging messages would cause overload. Moreover, the warning may be provided by a multimedia messaging in E-UTRAN. Thus, the present disclosure proposes to implement transfer/update of the warning not on PCCH but on a common logical channel. (e.g. ETWS specific MTCH, CTCH or CCCH) Here, the common logical channel is mapped to DL-SCH.

The ETWS message on the DL-SCH may be periodically scheduled every ETWS period. Here, the ETWS period is not UE specific but cell specific. After receiving primary indication of the warning, the UEs may receive DL-SCH to receive ETWS message every ETWS period. The ETWS message may include details of the warning and/or update of the warning.

In addition, the PDCCH may help UE to save its battery. If the ETWS message is transmitted on DL-SCH, the PDCCH may indicate an ETWS RNTI. The eNB may perform HARQ re-transmission for the ETWS message on the DL-SCH. The UE periodically monitors the PDCCH within a time window to check if there is the ETWS RNTI. If the UE finds the ETWS RNTI, the UE receives the ETWS message on the DL-SCH. If the UE fails to find the ETWS RNTI within the time window, the UE may perform DRX and may wait until the next time window.

Apart from the HARQ re-transmission on the DL-SCH, the eNB may repeat transmission of ETWS message. Further, the eNB may sometimes transmit a new ETWS message. Thus, such update information may be provided by either the ETWS message or the PDCCH.

ETWS scheduling information should be provided to UE. The ETWS scheduling information can be provided by system information on a BCCH. If a paging message is used to carry the primary indication of the warning, the paging message could also provide the ETWS scheduling information only to idle UEs. Moreover, ETWS channel configuration also can be carried on system information on BCCH.

In summary, the present disclosure provides two steps (i.e., step 1: Primary indication of Earthquake and Tsunami Warning, step 2: Transfer/update of Earthquake and Tsunami Warning) for transmitting/receiving ETWS message, and proposes that the UEs receive primary indication of the warning by finding out inclusion of ETWS specific common channel configuration in SIB or by receiving ETWS specific RNTI on PDCCH, a common logical channel mapped onto DL-SCH is used to carry ETWS message, once the warning begins, the eNB provides periodic opportunities on DL-SCH to carry ETWS message and UEs monitors the periodic opportunities every ETWS period, the PDCCH associated with the DL-SCH indicates the ETWS RNTI. The System information on BCCH and/or paging message for primary indication transfers ETWS scheduling information, and the System information on BCCH carries ETWS channel configuration.

In some case, if system information carries the primary notification as well as the secondary notification, it may not meet the delay requirement on the primary notification. It is because a typical length of the BCCH modification period is more than the delay requirement (i.e. 4 seconds). However, the present disclosure propose to implement this scheme because E-UTRAN will have only one delivery mechanism for the ETWS notification regardless of the type of the notification (i.e. the primary or the secondary notification), if the primary notification is carried on BCCH. Also, if it is the case, the same level of security (i.e. the digital signature based security) can be applied to the primary notification as well as the secondary notification.

One possibility to meet the delay requirement of the primary notification on BCCH is to have an ETWS specific BCCH modification period carrying ETWS messages, such as an ETWS modification period. The length of the ETWS modification period may be equal to or more than the length of the paging DRX cycle and should be less than the length of the normal BCCH modification period. Here, the ETWS modification period has no impact on operation of normal system information blocks because delivery of the ETWS message on BCCH does not change any other system information. Only the ETWS messages on BCCH may follow the ETWS modification period. It should be noted that configuration of ETWS delivery including the length of the ETWS modification period will be broadcast on the other SIB than the SIB carrying ETWS messages. The SIB carrying the configuration of ETWS delivery follows the normal BCCH modification period.

It should be noted that system information mentioned in present disclosure may be divided into the Master Information Block (MIB) and a number of System Information Blocks (SIBs). The MIB includes a limited number of most essential and most frequently transmitted parameters that are needed to acquire other information from the cell, and is transmitted on BCH. SIBs other than System Information Block Type1 may be carried in System Information (SI) messages and mapping of SIBs to SI messages is flexibly configurable by scheduling Information included in System Information Block Type1. The SI messages are transmitted within periodically occurring time domain windows (referred to as SI-windows) using dynamic scheduling. The UE acquires the detailed time-domain scheduling (and other information, e.g. frequency-domain scheduling, used transport format) from decoding SI-RNTI on PDCCH. A single SI-RNTI is used to address System Information Block Type1 as well as all SI messages. The System Information Block Type1 configures the SI-window length and the transmission periodicity for the SI messages. The System Information Block Type10 may contain an ETWS primary notification and the System Information Block Type11 may contain an ETWS secondary notification. More specifically, fields included in the SIB type 10 and/or SIB type 11 may contains a parameter or value to indicate a source and type of ETWS notification, variations of the ETWS notification, a warning type of the ETWS notification, security information for the ETWS notification, and segment number of the ETWS warning message segment, etc.

The purpose of the present disclosure is to transmit paging information (or message) to a UE in RRC_IDLE mode and/or to inform UEs in RRC_IDLE mode and UEs in RRC_CONNECTED mode about a system information change and/or about an ETWS primary notification and/or ETWS secondary notification. The paging information is provided to upper layers, which in response may initiate RRC connection establishment, (e.g. to receive an incoming call). E-UTRAN may initiate the paging procedure by transmitting the Paging message at the UE's paging occasion. The E-UTRAN may also indicate a change of system information and/or provide an ETWS notification in the Paging message. Namely, if present, the indication of an ETWS primary notification and/or ETWS secondary notification may included in some field in the paging message.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of receiving a warning message in mobile communication system, the method comprising:
   receiving control information related to the warning message through a downlink channel,
   wherein the control information is received within periodically occurring time domain windows, and
   wherein a time domain scheduling for the reception of the control information is acquired from decoding a specific radio network temporary identifier (RNTI) on a physical downlink control channel (PDCCH); and
   receiving the warning message based on the received control information,
   wherein the control information is a system information (SI) message,
   wherein the warning message is an Earthquake and Tsunami Warning System (ETWS) message,
   wherein the ETWS message is divided into a primary ETWS notification and a secondary ETWS notification, and
   wherein the control information includes the primary ETWS notification contained in a system information block (SIB) type 10 and the secondary ETWS notification contained in a system information block (SIB) type 11.

2. The method of claim 1, wherein the primary ETWS notification is firstly received before the reception of the secondary ETWS notification.

3. The method of claim 1, wherein the downlink channel is a downlink shared channel (DL-SCH).

4. The method of claim 1, wherein the specific radio network temporary identifier (RNTI) is a system information-radio network temporary identifier (SI-RNTI).

5. The method of claim 1, wherein the periodically occurring time domain windows are system information-windows (SI-windows).

6. The method of claim 1, wherein the control information is received using dynamic scheduling.

7. The method of claim 4, wherein a single SI-RNTI is used to address the control information.

8. The method of claim 5, wherein system information block (SIB) type 1 configures a length of the SI-windows.

9. The method of claim 1, wherein the primary ETWS notification and the secondary ETWS notification are received based on scheduling information contained in a system information block (SIB) type 1.

* * * * *